United States Patent
Golding et al.

(10) Patent No.: US 8,760,739 B2
(45) Date of Patent: Jun. 24, 2014

(54) DYNAMIC SCANNER WITH WIDTH SENSING AND SINGLE POINT SENSOR

(75) Inventors: Paul Simon Golding, Hertford (GB); Michael John Wilsher, Herts (GB)

(73) Assignee: Xerox Corporation, Norwalk, CT (US)

( * ) Notice: Subject to any disclaimer, the term of this patent is extended or adjusted under 35 U.S.C. 154(b) by 136 days.

(21) Appl. No.: 13/542,036

(22) Filed: Jul. 5, 2012

(65) Prior Publication Data

US 2014/0009798 A1 Jan. 9, 2014

(51) Int. Cl.
 *H04N 1/46* (2006.01)
 *H04N 1/40* (2006.01)
 *H01L 27/00* (2006.01)

(52) U.S. Cl.
 USPC ......... 358/514; 358/449; 358/515; 250/208.1

(58) Field of Classification Search
 USPC ................ 358/514, 449, 515; 250/208.1
 See application file for complete search history.

(56) References Cited

U.S. PATENT DOCUMENTS

| | | | |
|---|---|---|---|
| 5,519,514 A * | 5/1996 | TeWinkle | ............. 358/514 |
| 6,646,248 B2 * | 11/2003 | Hosier et al. | ............ 250/208.1 |
| 7,139,108 B2 | 11/2006 | Andersen et al. | |
| 7,847,982 B2 | 12/2010 | Mizumukai | |
| 7,946,677 B2 | 5/2011 | Tamaki | |
| 2004/0145770 A1 | 7/2004 | Nakano et al. | |
| 2007/0165289 A1 | 7/2007 | Osakabe | |
| 2009/0087239 A1 | 4/2009 | Uchino et al. | |
| 2010/0039473 A1 | 2/2010 | Terada | |
| 2011/0049783 A1 | 3/2011 | Kozaki | |

* cited by examiner

*Primary Examiner* — Charlotte M Baker
(74) *Attorney, Agent, or Firm* — Kermit D. Lopez; Luis M. Ortiz; Ortiz & Lopez, PLLC

(57) ABSTRACT

A scanner apparatus and method includes an optical scanner, at least one movable carriage associated with the optical scanner, and a point sensor that rides the movable carriage to measure a slow scan document width associated with a document scanned by the optical scanner. The point sensor moves in a slow scan direction with respect to the document scanned by the optical scanner. The point sensor also includes a single moving size sensor that improves a resolution by which a size associated with the document is determinable.

20 Claims, 5 Drawing Sheets

DYNAMIC SCANNER WITH WIDTH SENSING AND SINGLE POINT SENSOR

TECHNICAL FIELD

Embodiments are generally related to the field of image production devices. Embodiments are also related to flatbed scanning systems and flatbed scanner devices. Embodiments are additionally related to size sensor utilized in flatbed scanners. Embodiments also relate to MFD (Multi-Function Device) rendering systems.

BACKGROUND OF THE INVENTION

Flatbed scanners typically perform a preview scan of an image that generates preview image data. The preview image data is then displayed in a viewing region of a user interface. The user interface allows the user to select an image region of the scanned preview image. A final scan is performed on the image region selected by the user.

The preview scan provides a user with great flexibility in selecting the image region; however, the use of a preview scan does require steps to be performed by the user before the final scan is performed. These steps performed before the final scan can be cumbersome and time consuming depending upon the speed of the scanner and the processing software.

Some flatbed scanners include half-rate and full-rate carriage devices. These devices, for example, involve a method used in some flatbed scanners for transporting scanner optics, such systems keep a constant distance between the imaging sensor and the document being scanned. Flatbed scanners also can incorporate the use of a CCD (Charge Coupled Device). A CCD is the most common type of imaging sensor in flatbed scanners, although other devices such as CIS (Contact Image Sensor) or FWA (Full Width Array) devices can be employed. A typical CCD sensor includes, for example, an array of light detectors that measure the differences in the intensity of the reflected light gathered from an original being scanned.

One of the problems with current flatbed scanners, particularly in the context of a MFD (Multi-Function Device), is that document size sensing on MFD scanners typically works by determining the document length in the fast scan direction using the devices imaging sensor and the width using one or more fixed size position sensors to distinguish between different but similar document sizes (e.g., A4 versus US letter) and long or short documents such as A4 and A3, where the fast scan length is the same. In some cases it may be difficult to physically locate the two fixed sensors as they may interlace with the moving optics within the scanner, and even if they can be mounted because they are fixed in position there is a limitation to the different paper sizes that they can resolve.

Based on the foregoing, it is believed that a need exists for an improved scanner apparatus and flatbed scanning system/configuration, as will be described in greater detailed herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved image production device and rendering method thereof.

It is another aspect of the disclosed embodiments to provide for an improved scanner apparatus and scanning method.

It is a further aspect of the disclosed embodiments to provide for a scanning configuration and method with a single point sensor located in a movable carriage for optical scanning operations.

The aforementioned aspects and other objectives and advantages can now be achieved as described herein. A scanner apparatus is disclosed, which includes an optical scanner, one or more movable carriages associated with the optical scanner, and at least one point sensor that rides the movable carriage to measure a slow scan document width associated with a document scanned by the optical scanner. The point sensor moves in a slow scan direction with respect to the document scanned by the optical scanner. The point sensor also includes a single moving size sensor that improves a resolution by which a size associated with the document is determinable. The movable carriage can be, for example, a full-rate carriage or a full-rate/half-rate carriage system. In some embodiments, the point sensor can be mounted to the half-rate carriage. In other embodiments, the point sensor (e.g., one or more sensors) can be mounted to the full-rate carriage. The carriage can position the point sensor at strategic locations in a document size map to resolve detection issues.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
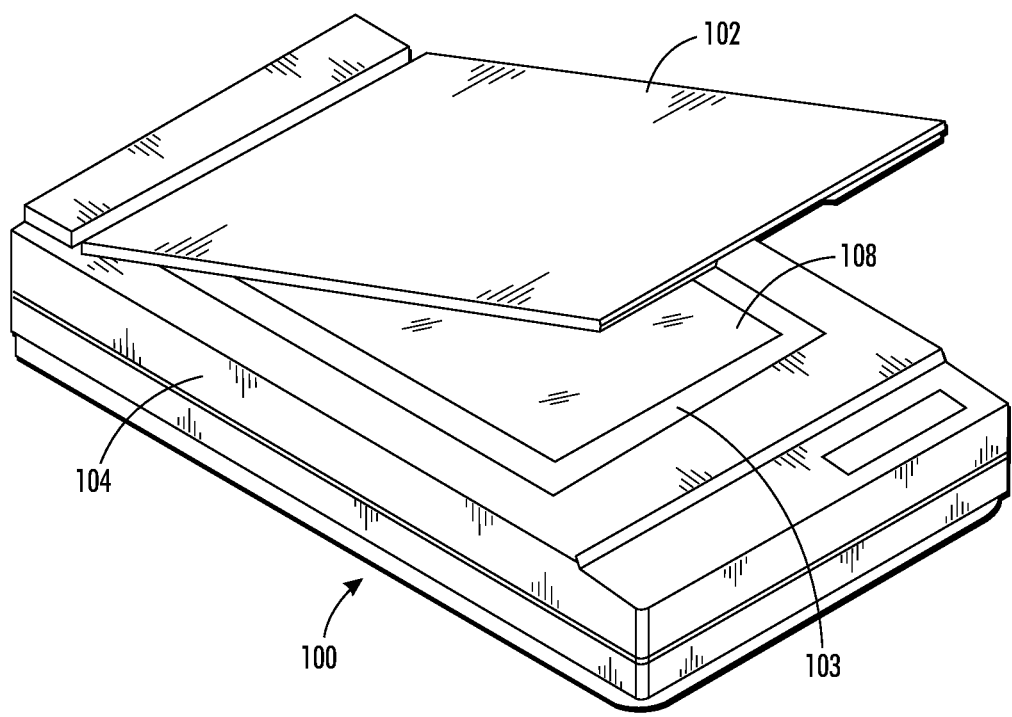
FIG. 1 illustrates an exemplary diagram of an image production device in accordance with one possible embodiment.

FIG. 1 is an exemplary diagram of an image production device 100 in accordance with one possible embodiment. The image production device 100 may be any device or combination of devices that may be capable of making image production documents (e.g., printed documents, copies, etc.) including a copier, a printer, a facsimile device, and a multi-function device (MFD), for example. In the image production device 100 shown in FIG. 1, however, the image production device is shown as a standalone flatbed scanner.

Note that there are many applications that need optical scanners to convert paper-based objects, such as texts and graphics, to an electronic format that can be subsequently analyzed, distributed, and archived. One of the most popular optical scanners is flatbed scanners that convert objects, including pictures and papers, to images that can be used, for example, for building Web pages and optical character recognition. The optical scanners are sometimes referred to as image scanners as the output thereof is generally in digital images.

FIG. 1 thus demonstrates one example of a flatbed scanner 100. Similar to a copy machine, flatbed scanner 100 includes a cover or lid 102 and a glass panel 103. Generally, a scanning document 108 must be placed on the glass panel 103 and faced down with the lid 102 closed, so that an image sensing mechanism or imager in compartment 104 can properly scan scanning document 108.

Figure 2:
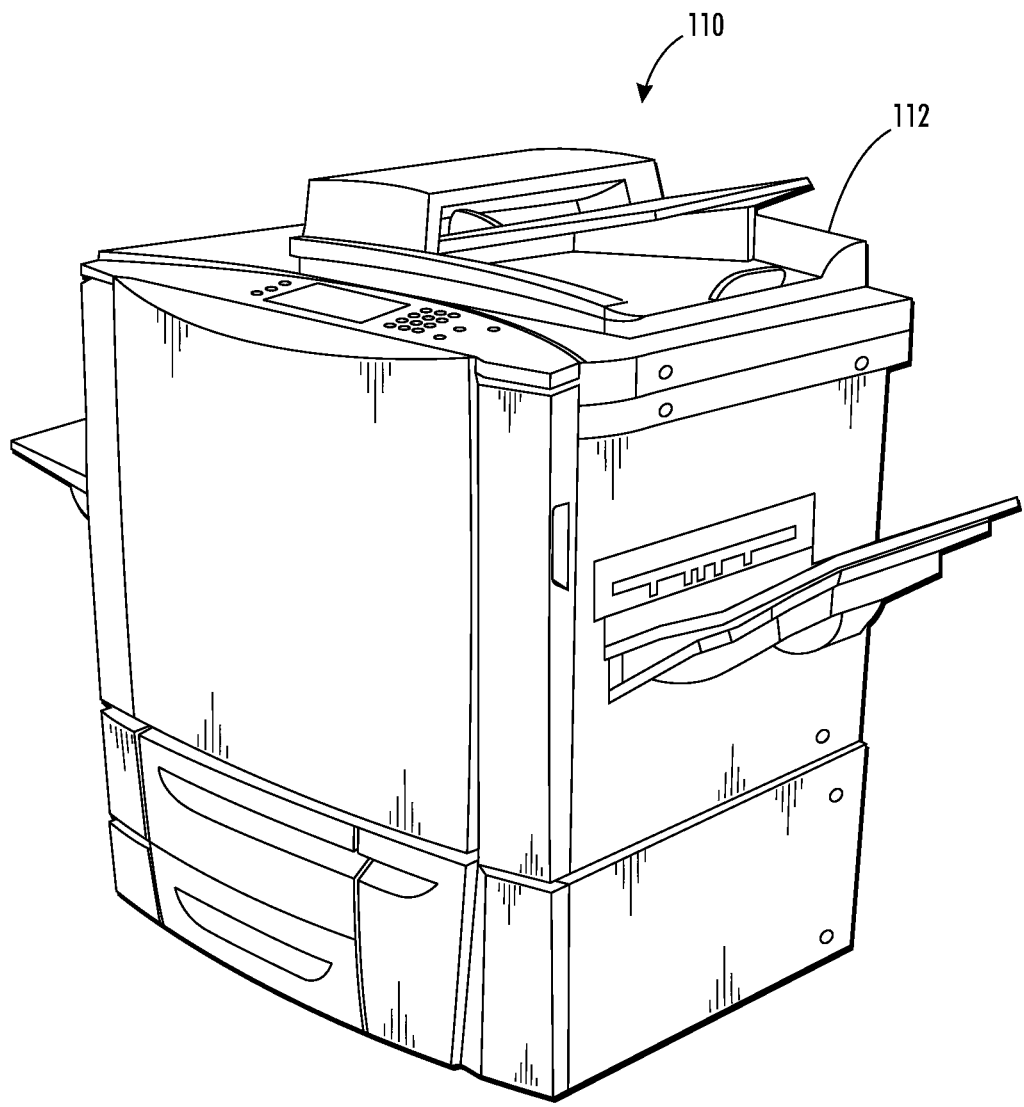
FIG. 2 illustrates an exemplary diagram of an image production device in accordance with another possible embodiment.

FIG. 2 illustrates an exemplary diagram of an image production device 110 in accordance with another possible embodiment. The image production device 110 is a MFD and offers a variety of rendering applications such as copying, scanning, printing, etc. Similar to the flatbed scanner device 100 shown in FIG. 1, the image production device 110 (e.g., MFD) includes a cover or lid 112 and a glass panel (not shown) beneath the lid 112. For flatbed scanning applications, the lid 112 is lifted and the scanning document placed on the glass panel and faced down with the lid 112 closed so that an image sensing mechanism or imager (not shown in FIG. 2) can properly scan the document. The image production device 110 thus incorporates a flatbed scanning system similar to that of the flatbed scanner 100 in FIG. 1.

In general, document size sensing on MFD scanners typically works by determining the document length in the fast scan direction using the devices imaging sensor and the width using one or more fixed size sensors to distinguish between different but similar document sizes (e.g., A4 vs US letter) or long and short documents such as A4 and A3. In some cases, it may be difficult to physically locate the fixed sensors as they may interface with the moving optics within the scanner, and even if they can be mounted because they are fixed in position there is a limitation to the different paper sizes that they can resolve.

The approach described herein includes a single moving size sensor that addresses the issue of location being a physical limitation to the optical scanning system. Such an approach improves the resolution by which paper size can be determined and may also have a cost benefit by reducing the number of sensors (e.g., along with the associated electronics/harnesses etc.).

The size sensor can be physically mounted on to the half-rate carriage in a full-rate/half-rate carriage system. When the full-rate carriage moves to the doc size position to determine the document length in the fast scan direction, the half rate carriage translates the sensor over the document in the slow scan direction, thereby accurately determining the document width. In a single carriage full-rate system, again the sensor can be mounted on this carriage and positioned accordingly.

Figure 3:
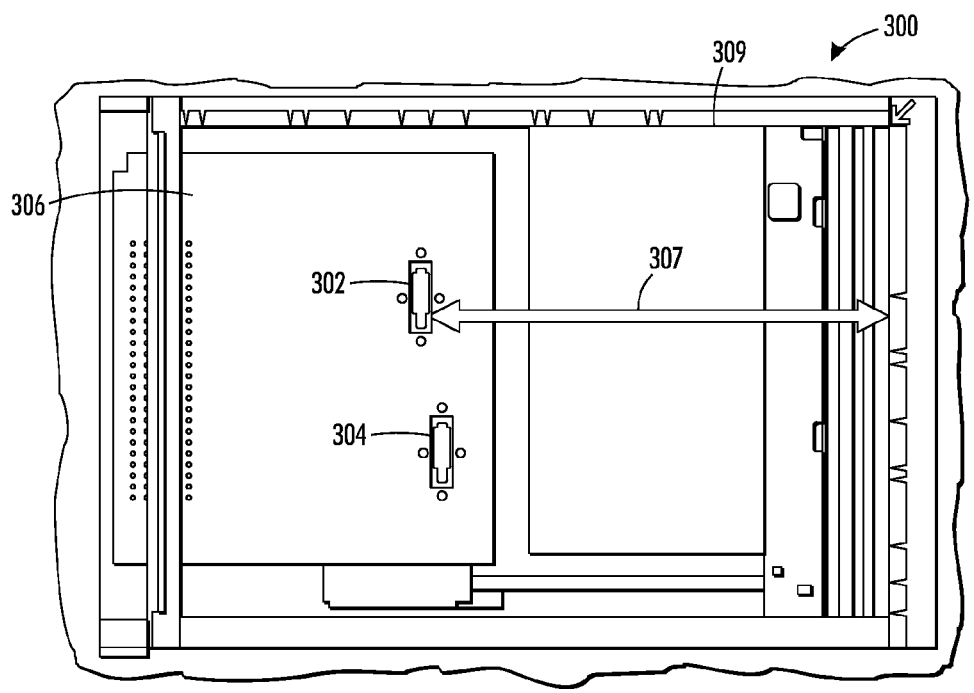
FIG. 3 illustrates a top view of a prior art scanner apparatus that includes two size sensors for use in determining a size of a document to be scanned and in conjunction with a CCD sensor that measures the height of the document/page.
Figure 4:
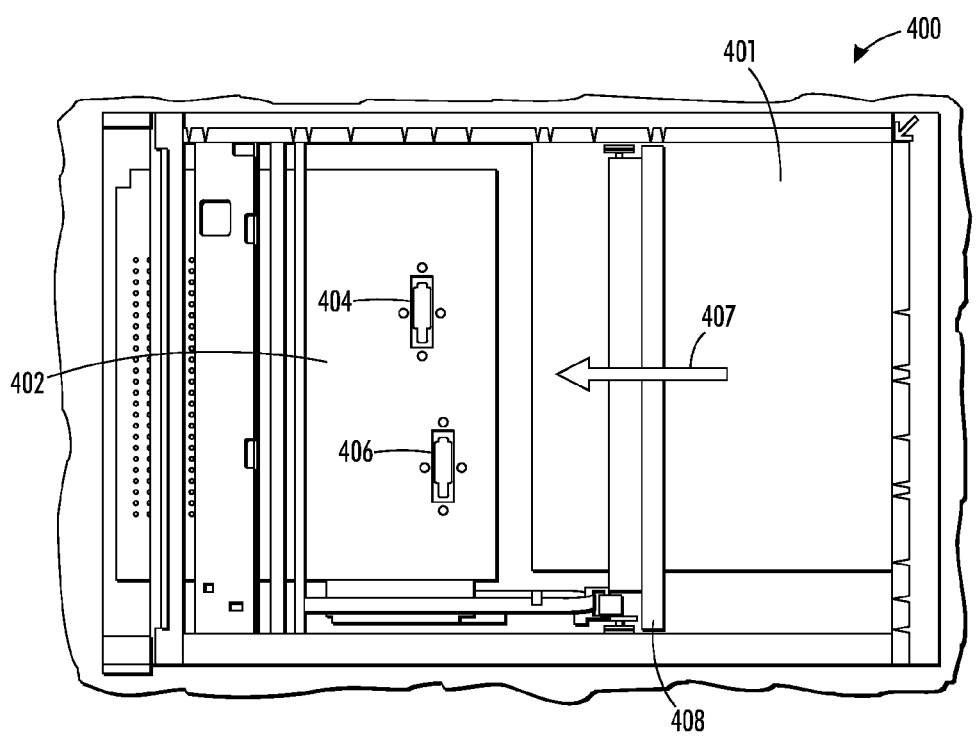
FIG. 4 illustrates a top view of a prior art scanner apparatus that includes a half rate carriage traversing the RHS of the scanner base.
Figure 5:
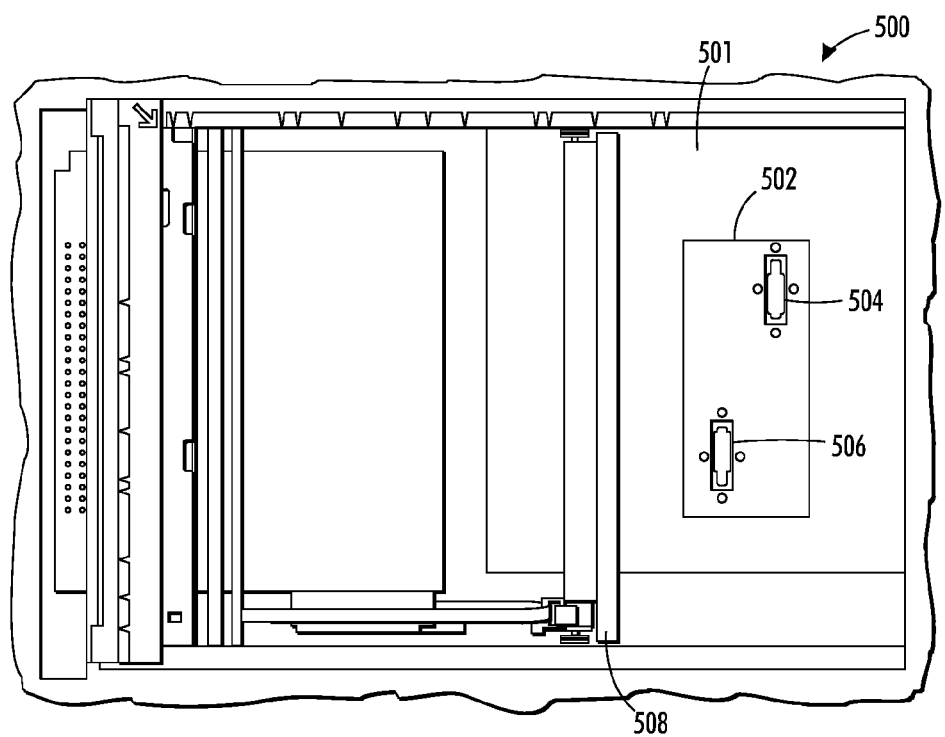
FIG. 5 illustrates a top view of a prior art scanner apparatus in which an image is registered on the left hand side and two size sensors would be required to be located on the right hand side.

In order to appreciate why the use of a single point sensor solves the problems associated with the prior art, reference is made to FIGS. 3 to 5 herein. FIG. 3 illustrates a top view of a prior art scanner apparatus 300 that includes two size sensors 302 and 304 for use in determining a size of a document to be scanned and in conjunction with a CCD sensor that measures the height of the document/page. Traditional size sensing on a flatbed scanner utilizes two size sensors such as sensors 302, 304 in the scanner to determine the paper size in conjunction with a CCD Sensor, which measures the height of the page. One size sensor (e.g., sensor 302 or 304) is used to detect short and long media (e.g., A4 and A3 with the same height), and the second size sensor (e.g., sensor 302 or 304) is used to detect the SEF 8.5×11 to A4 difference (e.g., here the height is too close to accurately determine from the CCD sensor). The two size sensors are located in an optics cover 306 as depicted in FIG. 3 or may be mounted on separate mounting brackets. The arrow 307 shown in FIG. 3 indicates the distances between the furthest left sensor 302 and the right side of the platen 309 and the carriages at the full RHS position.

FIG. 4 illustrates a top view of a prior art scanner apparatus 400, which is essentially the same scanner as depicted in FIG. 3, but with the half-rate and full-rate carriages at the fully extended LHS position. Apparatus 400 includes two sensors 404, 406 located in an optics cover 402 as in FIG. 3. Arrow 407 shown in FIG. 4 indicates the carriage motion direction. The scanner platen 401 is also depicted in FIG. 4

FIG. 5 illustrates a top view of a prior art scanner apparatus 500 in which an image is registered on the left hand side and two size sensors 504, 506 are required to be located on the right section 502. The scanner platen 501 is also shown in FIG. 5. If the image is registered on the left hand side, the two size sensors 504, 506 are required to be located on the right, however, the half rate carriage 508 traverses this section and there is no room for the sensor. This would mean a re-design of the scanner. In other words, the sensors 504, 506 will clash with the half rate carriage 508. Note that in the prior art example depicted in FIG. 5, designing a compact system is challenging as the half rate carriage is required to move over the sensor positions and the design is impractical. This configuration illustrates a requirement for and the design problem with fixed sensors.

Figure 6:
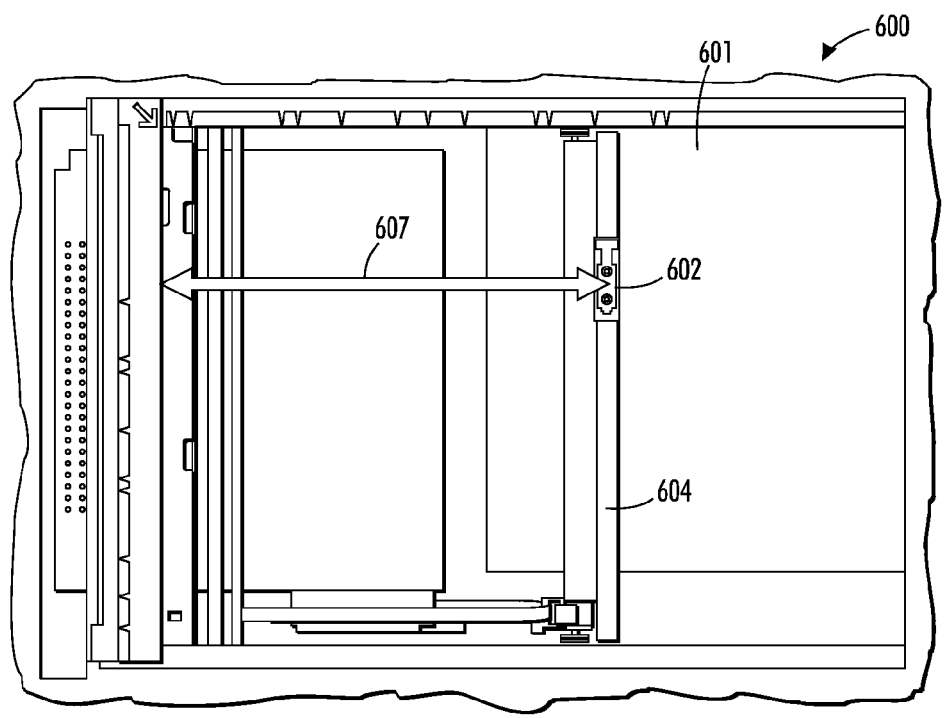
FIG. 6 illustrates a top view of a scanner apparatus employing a single size sensor to a movable half-rate (or full-rate) carriage, in accordance with a preferred embodiment.

FIG. 6 illustrates a top view of a scanner apparatus 600 employing a single size sensor 602 connected to a movable half-rate carriage 604, in accordance with a preferred embodiment. In the configuration depicted in FIG. 6, the single size sensor 602 is fitted to the movable half-rate carriage 604. This reduces the cost of the sensor budget and also increases the flexibility of size detection as the width of any page can be determined by moving the scan head. The full-rate scan carriage is normally at the document size position; this positions the half-rate carriage and hence the affixed sensor almost perfectly at the A3 sheet point. The sensor 602 may be moved to other points for size detect as required, Such a configuration offers other savings in metal work and the use of a single sensor positioned as required for the customer/market requirements. The arrow 607 shown in FIG. 6 indicates the distance between the sensor 602 and the carriage 604 and the left hand side of the platen 601. The size sensors are typically not used for scanning the slow scan direction and this function would be carried out with the normal CCD sensor (as in a pre-scan). Additionally, two basic systems can exist: a single 'full rate' carriage system (where the sensor is within the carriage) and a full/half rate carriage system where the sensor is fixed (e.g., in the scanner base in the illustrated embodiment).

Figure 7:
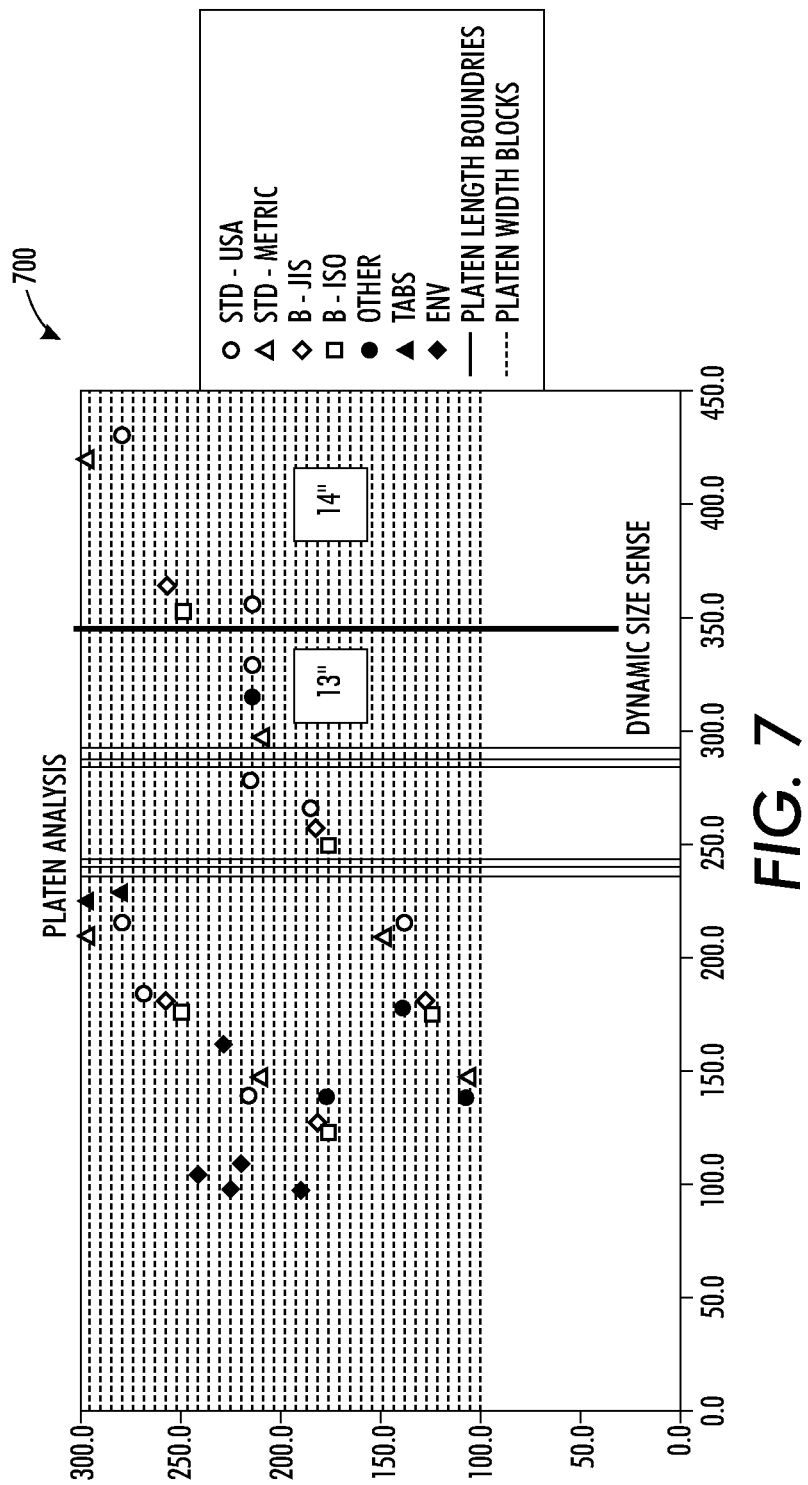
FIG. 7 illustrates a graph depicting size sense positions currently used to detect page differences.

FIG. 7 illustrates a graph 700 depicting size sense positions currently used to detect page differences. As depicted in graph 700, the vertical axis tracks the page height detection and is performed by the CCD. The horizontal axis is the page width and is performed by the point size detect sensor or sensors (i.e., one or more point size sensors can be employed). As can be seen, there are paper sizes which are on the same height boundaries and with one or two fixed width sensors that cannot be differentiated. For example, the circle group can be differentiated from the Standard USA type to the left but not from each other. Sometimes this is not an issue for the customer as he can select a market region and he only uses one paper size in the area. However, customers that have a mix of the two USA Standard sizes of 13 inch and 14 inch would struggle. The approach described herein allows the width sensor to simply be repositioned as indicated by the red line and now we can tell the difference between these types. This is an additional benefit of the movable sensor, as can be seen from the graph, and is not limited to the example(s) described herein. Other sizes and size sense positions where this design would be beneficial are also possible.

Based on the foregoing, it can be appreciated that a number of embodiments, preferred and alternative, are disclosed herein. For example, a scanner apparatus is disclosed which includes an optical scanner; one or more movable carriage(s) associated with the optical scanner; and one or more point sensor(s) that ride the movable carriage(s) to measure the slow scan document width associated with a document scanned by the optical scanner. In another embodiment, the point sensor(s) can move in a slow scan direction with respect to the document scanned by the optical scanner, In yet another embodiment, one or more of the point sensors can include a single moving size sensor that improves a resolution by which a size associated with the document is determinable. In other embodiments, the point sensor(s) is movable to improve the detection of the size associated with the document. In some embodiments, the movable carriage(s) may be a full-rate carriage. In other embodiments, the movable carriage(s) include a half-rate carriage and a full-rate carriage in the context of full-rate/half-rate carriage system. In other embodiments, the point sensor(s) can be mounted to the half-rate carriage. In still other embodiments, the full-rate carriage can translate the point sensor(s) over the document in a slow scan direction to accurately determine the width of the document. In still other embodiments, the point sensor is positionable at strategic locations in a document size map to resolve detection issues.

Another scanner apparatus embodiment can include an optical scanner, one or more movable carriages associated with the optical scanner, and one or more point sensors that ride the movable carriage(s) to measure the slow scan document width associated with a document scanned by the optical scanner, and wherein the point sensor(s) is movable to improve the detection of a size associated with the document. In some embodiments, the point sensor(s) moves in a slow scan direction with respect to the document scanned by the optical scanner. In other another embodiment, the point sensor(s) can include a single moving size sensor that improves the resolution by which a size associated with the document is determinable. In another embodiment, the movable carriage(s) may be a full-rate carriage. In still other embodiments, the movable carriage can include a half-rate carriage and a full-rate carriage in a full-rate/half-rate carriage system; the point sensor(s) can be mounted to the half-rate carriage; and the full-rate carriage can translate the point sensor(s) over the document in a slow scan direction to accurately determine the width of the document. In yet other embodiments, the point sensor(s) is positionable at strategic locations in a document size map to resolve detection issues.

In yet another embodiment, a method for scanning a document can be implemented. Such a method can include the steps of associating open or more movable carriage with an optical scanner and automatically measuring the slow scan document width associated with a document scanned by the optical scanner utilizing one or more sensors that ride one or more of the movable carriages. In another embodiment of such a method, the point sensor(s) can move in a slow scan direction with respect to the document scanned by the optical scanner. In yet another embodiments of such a method, the point sensor(s) can include a single moving size sensor that improves resolution by which a size associated with the document is determinable. In still another embodiment of such a method, the point sensor(s) is movable to improve a detection of a size associated with the document.

It will be appreciated that variations of the above-disclosed and other features and functions, or alternatives thereof, may be desirably combined into many other different systems or applications, for example, a single carriage system with more than one movable sensor and so on. Also, that various presently unforeseen or unanticipated alternatives, modifications, variations or improvements therein may be subsequently made by those skilled in the art which are also intended to be encompassed by the following claims.

The invention claimed is:

1. A scanner apparatus, comprising;
   an optical scanner;
   at least one movable carriage associated with said optical scanner; and
   at least one point sensor that rides said at least one movable carriage to measure a slow scan document width associated with a document scanned by said optical scanner.

2. The apparatus of claim 1 wherein said at least one point sensor moves in a slow scan direction with respect to said document scanned by said optical scanner.

3. The apparatus of claim 1 wherein said at least one point sensor comprises a single moving size sensor that improves a resolution by which a size associated with said document is determinable.

4. The apparatus of claim 1 wherein said at least one point sensor is movable to improve a detection of a size associated with said document.

5. The apparatus of claim 1 wherein said at least one movable carriage comprises a full-rate carriage.

6. The apparatus of claim 1 wherein said at least one movable carriage comprises a half-rate carriage and a full-rate carriage in a full-rate/half-rate carriage system.

7. The apparatus of claim 6 wherein said at least one point sensor is mounted to said half-rate carriage.

8. The apparatus of claim 6 wherein said full-rate carriage translates said at least one point sensor over said document in a slow scan direction to accurately determine a width of said document.

9. The apparatus of claim 1 wherein said at least one point sensor is positionable at strategic locations in a document size map to resolve detection issues.

10. A scanner apparatus, comprising:
- an optical scanner;
- at least one movable carriage associated with said optical scanner; and
- at least one point sensor that rides said at least one movable carriage to measure a slow scan document width associated with a document scanned by said optical scanner, wherein said at least one point sensor is movable to improve a detection of a size associated with said document.

11. The apparatus of claim 10 wherein said at least one point sensor moves in a slow scan direction with respect to said document scanned by said optical scanner.

12. The apparatus of claim 10 wherein said at least one point sensor comprises a single moving size sensor that improves a resolution by which a size associated with said document is determinable.

13. The apparatus of claim 10 wherein said at least one movable carriage comprises a full-rate carriage.

14. The apparatus of claim 10 wherein:
- said at least one movable carriage comprises a half-rate carriage and a full-rate carriage in a full-rate/half-rate carriage system;
- said at least one point sensor is mounted to said half-rate carriage; and
- said full-rate carriage translates said at least one point sensor over said document in a slow scan direction to accurately determine a width of said document.

15. The apparatus of claim 10 wherein said at least one point sensor is positionable at strategic locations in a document size map to resolve detection issues.

16. A method for scanning a document, said method comprising:
- associating at least one movable carriage with an optical scanner; and
- automatically measuring a slow scan document width associated with a document scanned by said optical scanner utilizing at least one sensor that rides at least one movable carriage.

17. The method of claim 16 wherein said at least one point sensor moves in a slow scan direction with respect to said document scanned by said optical scanner.

18. The method of claim 16 wherein said at least one point sensor comprises a single moving size sensor that improves a resolution by which a size associated with said document is determinable.

19. The method of claim 16 wherein said at least one point sensor is movable to improve a detection of a size associated with said document.

20. The method of claim 16 wherein said at least one movable carriage comprises a half-rate carriage and a full-rate carriage in a full-rate/half-rate carriage system.

* * * * *